United States Patent [19]
Akita et al.

[11] Patent Number: 6,105,736
[45] Date of Patent: Aug. 22, 2000

[54] DISC BRAKE AND ANTI-SQUEAL SHIM THEREFOR

[75] Inventors: Hiroaki Akita, Gotenba; Yoshimichi Okazaki, Okayama-ken, both of Japan

[73] Assignee: U-Sun Gasket Corporation, Shizuoka-ken, Japan

[21] Appl. No.: 09/060,403

[22] Filed: Apr. 15, 1998

[30] Foreign Application Priority Data

Feb. 4, 1998 [JP] Japan ................... 10-038086

[51] Int. Cl.⁷ .................................. F16D 65/38
[52] U.S. Cl. ...................... 188/73.37; 188/251 A
[58] Field of Search ............. 188/73.37, 251 A, 188/73.1, 250 E, 250 B, 251 R, 250 M, 250 G, 264 G, 218 A, 205 A, 250 A, 378, 379, 380, 218 XL; 192/107 R, 55.3, 55.2, 55.6, 70.17

[56] References Cited

U.S. PATENT DOCUMENTS

| | | | |
|---|---|---|---|
| 4,373,615 | 2/1983 | Melinat | 188/73.1 |
| 5,413,194 | 5/1995 | Kulis, Jr. et al. | 188/251 A |
| 5,575,358 | 11/1996 | McCormick | 188/71.6 |
| 5,762,166 | 6/1998 | Yano et al. | 188/73.37 |
| 5,842,546 | 12/1998 | Biswas | 188/73.37 |

FOREIGN PATENT DOCUMENTS 63-101530   5/1988   Japan .

*Primary Examiner*—Robert J. Oberleitner
*Assistant Examiner*—Melanie Talavera
*Attorney, Agent, or Firm*—Birch, Stewart, Kolasch & Birch, LLP

[57] ABSTRACT

An anti-squeal shim comprises a metal plate and a compound layer applied only to one face of the metal plate. The compound includes a nonmetal fiber other than asbestos, an elastomer and a filler. The thickness of the compound layer is determined to be from 200 to 800 micron. The anti-squeal shim is disposed between a forcing member that urges a friction pad against a disc rotor and a backing plate of the friction pad in a disc brake with the metal plate opposed to the forcing member without the intervention of a backing-up shim and with the compound layer opposed to the backing plate.

26 Claims, 3 Drawing Sheets

DISC BRAKE AND ANTI-SQUEAL SHIM THEREFOR

BACKGROUND OF THE INVENTION

1. Field of the Invention

This invention relates to a disc brake, and more particularly to an anti-squeal shim structure therein for eliminating "brake squeal" and for heat insulation.

2. Prior art

A disc brake generally includes a disc rotor rotating with a wheel of an automotive vehicle, a pair of friction pads each having a backing plate and a friction member secured to the disc rotor side of the backing plate, a caliper secured to a support member of the vehicle and supporting the friction pads movably toward and away from opposite friction surfaces of the disc rotor, and hydraulic actuating means urging the friction pads through forcing members such as a brake piston and a finger of the caliper against the friction surfaces of the disc rotor to restrain the rotation of the disc rotor.

With such a construction, a disc brake may under some conditions emit squealing noise during operation. This brake squeal noise is considered to be caused by relative displacements between the backing plates of the friction pads and the forcing members, and by vibrations due to an interaction between the friction pads and the disc rotor when the friction pads are pressed against the disc rotor.

To reduce or eliminate such brake squeal noise, anti-squeal shims are generally each made of a steel plate with damping material layers applied to both faces thereof, where the anti-squeal shims have been interposed between the friction pads and the forcing members. In most cases, each damping material layer of the anti-squeal shims is formed only of a rubber and selected to be about 100 microns thick. One of the present inventors have disclosed another type of anti-squeal shim, in Japanese Patent Laying-open Publication No. Showa 63-101530, wherein the damping material layers are formed of a compound including a nonmetal fiber other than asbestos, an elastomer and a filler. It should be noted that, in either case, the prior art anti-squeal shims have both faces thereof coated with the damping material layers.

On the other hand, generally, the contact area between the anti-squeal shim and the forcing member such as a brake piston or a finger of the caliper is relatively small. For example, the brake piston is usually hollow with a thin wall shell with the open end thereof opposed to the anti-squeal shim, and thereby the contact area between the anti-squeal shim and the piston forms a ring shape. Accordingly, in the case of a conventional anti-squeal shim coated on both faces thereof with the damping material layers, an extremely high pressure will be partially applied to the damping material layer on the side of the forcing member, if the anti-squeal shim and the forcing member are directly opposed to each other. To obviate the above-mentioned disadvantage, another shim, so-called "backing-up shim", has heretofore been interposed between the anti-squeal shim and the forcing member.

However, the disc brake apparatus equipped with the backing-up shim has the following disadvantages:

(a) The numbers of parts as well as manufacturing costs are increased.

(b) Even if the anti-squeal shim is provided with holes therethrough or recesses at the periphery thereof to improve the heat insulating effect, the desired effect can not be produced because the backing-up shim covers the holes or recesses.

SUMMARY OF THE INVENTION

It is accordingly a principal object of the present invention to provide a disc brake and anti-squeal shim therefor which can dispense with a backing-up shim.

It is a further object of the present invention to provide a disc brake and anti-squeal shim therefor where an excellent heat insulating effect can be produced.

According to the present invention, an anti-squeal shim comprises a metal plate and a compound layer applied only to one side of the metal plate. The compound includes a nonmetal fiber other than asbestos, an elastomer and a filler. The thickness of the compound layer is determined to be from 200 to 800 micron. The anti-squeal shim is disposed between the forcing member and the backing plate of the friction pad with the metal plate opposed to the forcing member without the intervention of a backing-up shim and with the compound layer opposed to the backing plate.

In the event that a metal plate is coated with a layer of a rubber only, the thickness of the rubber layer should be less than about 100 micron, because the thicker the rubber layer is, the more it is liable to produce stress relaxation. Therefore, in the event that the metal plate is coated only on one face thereof with a rubber alone layer, satisfactory vibration damping properties can not be obtained and the brake squeal can not be prevented effectively.

According to the present invention, however, since the metal plate is coated with a layer of a compound including a nonmetal fiber other than asbestos, an elastomer and a filler, the stress relaxation is hard to occur even if the compound layer is thickened up from 200 to 800 micron. Consequently, even with the metal plate coated only on one face with the compound layer, satisfactory vibration damping properties can be obtained and the brake squeal can be effectively prevented. Therefore, it is not necessary to coat the forcing member side face of the metal plate with the compound layer and the backing-up shim is not necessary.

In addition, since the compound layer includes a nonmetal fiber that has a small thermal conductivity, the heat insulating properties thereof are better than that of a rubber only layer, and thereby the heat transfer from the friction pad to the brake fluid in the hydraulic system via the anti-squeal shim can be decreased and the reliability of the hydraulic system of the brake apparatus can be improved.

Further, since a backing-up shim is not necessary, when the anti-squeal shim is provided with holes therethrough or recesses at the periphery thereof, they are not closed by the backing-up shim and are allowed to limit the heat conduction paths in the disc brake. At the same time, the holes or recesses form air passages which are open to the contact between the anti-squeal shim and the forcing member such as a brake piston or a finger of a caliper, causing air flows therethrough to make heat radiation efficiently. Consequently, the heat insulating effect is improved and heat transfer to the brake fluid in the hydraulic system is decreased, causing the reliability of the disc brake to be improved.

When the compound layer is thinner than 200 micron, satisfactory vibration damping properties can not be obtained, while when it is thicker than 800 micron, a stress relaxation is liable to occur in the anti-squeal shim.

DETAILED DESCRIPTION OF THE INVENTION

Figure 1:
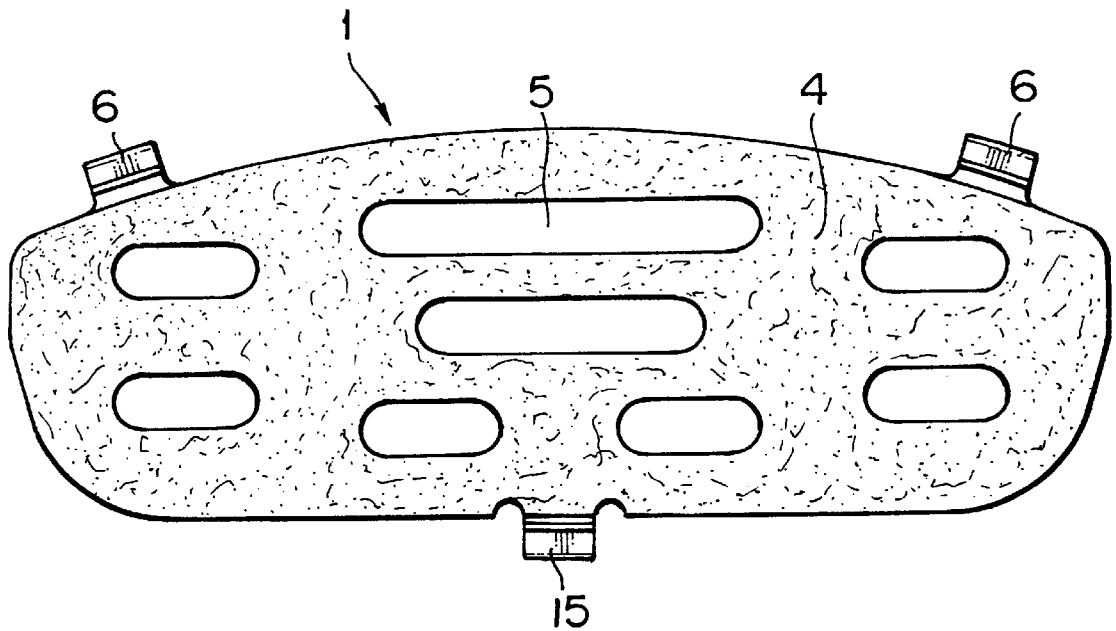
FIG. 1 is a front elevation view of an anti-squeal shim in one embodiment of the present invention.

The metal plate in the present invention preferably is a stainless steel plate or a steel plate.

The nonmetal fiber other than asbestos in the compound of the present invention may be an inorganic fiber, organic fiber or a mixture of them. However, in the event that the nonmetal fiber of the compound is formed only of an inorganic fiber other than asbestos, the vibration damping properties of the compound layer will be deteriorated, because an inorganic fiber lacks softness. On the other hand, in the event that the nonmetal fiber of the compound is formed only of an organic fiber, the heat resisting properties of the anti-squeal shim will be deteriorated, because an organic fiber has inferior heat resisting properties. Therefore, it is preferable to incorporate both an inorganic fiber and an organic fiber in mixture.

Inorganic fibers for the compound of the present invention may be a glass fiber, ceramic fiber, rock wool, mineral wool, fused quartz fiber, chemical processed high silica fiber, fused alumina silicate fiber, alumina continuous fiber, stabilized zirconia fiber, boron nitride fiber, alkali titanate fiber, whiskers, boron fiber, or the like.

Organic fibers for the compound of the present invention may be aromatic polyamide fibers, polyamide fibers other than aromatic polyamide fibers, polyolefine fibers, polyester fibers, polyacrylonitrile fibers, polyvinyl alcohol fibers, polyvinylchloride fibers, polyurea fibers, polyurethane fibers, polyfluorocarbon fibers, phenol fibers, cellulosic fibers, or the like.

Preferably the total amount of the nonmetal fiber in the compound is from 30% to 80% by weight.

The rubber in the compound of the present invention may be styrene-butadiene rubber (SBR), acrylonitrile-butadiene rubber (nitrile rubber, NBR), isoprene rubber (IR), chloroprene rubber (CR), butadiene rubber (BR), isobutylene-isoprene rubber (IIR), ethylene propylene rubber (EPM), fluoro rubber (FPM), silicone rubber (Si), chlorosulfonated polyethylene (CSM), ethylene-vinylacetate copolymers (EVA), chlorinated polyethylene (CPE), chloro-isobutane-isoprene rubber (CIIR), epichlorohydrin rubber (ECO), nitrile isoprene rubber (NIR) or the like. Elastomers other than rubbers may also be used.

The filler in the compound of the present invention may be either an inorganic filler or organic filler. However, when an organic filler is used, the heat resisting properties of the anti-squeal shim, in general, will be deteriorated. Accordingly, it is preferable to use an inorganic filler such as clay, talc, barium sulfate, sodium bicarbonate, graphite, lead sulfate, tripoli, wollastonite, or the like.

The present invention will hereunder be described in conjunction with a preferred embodiment of the invention that is shown in the drawings.

Figure 2:
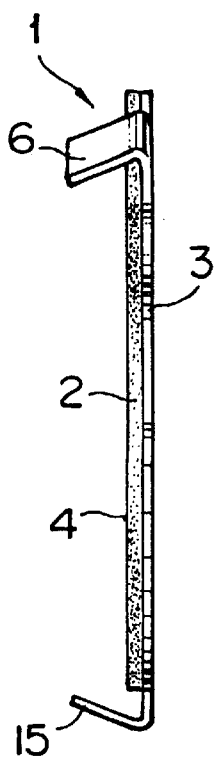
FIG. 2 is an enlarged side elevation view of the anti-squeal shim.
Figure 3:
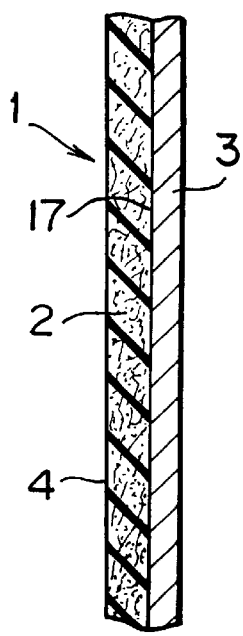
FIG. 3 is an enlarged cross sectional view of a part of the anti-squeal shim.

FIGS. 1 through 3 show an anti-squeal shim 1 used in one embodiment of the present invention. The anti-squeal shim 1 is obtained by the following processes. First, a stainless steel plate 3 is coated only to one face thereof with a heat-resistant adhesive 17 (see FIG. 3). Then the face of the stainless steel plate 3 is further coated with a compound layer 2 having the composition mentioned below.

(Composition of the compound)

| | | |
|---|---|---|
| (i) | Glass fiber | 30% by weight |
| (ii) | Fibrillated aromatic polyamide fiber (Trade name "Kevlar Pulp" manufactured by Du pont) | 10% by weight |
| (iii) | Nitrile rubber (NBR) | 16% by weight |
| (iv) | Rubber agent | 4% by weight |
| (v) | Inorganic filler | 40% by weight |

For the above compound, the glass fiber that is selected is a heat-resistant inorganic fiber and the fibrillated aromatic polyamide fiber that is selected is a heat-resistant organic fiber.

The rubber agent may be a vulcanizing agent such as sulfur, zinc oxide, magnesium oxide, peroxide, dinitrobenzene, or the like, or a vulcanization accelerator such as thiazole compounds, polyamine compounds, sulfenamide compounds, dithiocarbamate compounds, aldehydeamine compounds, guanidine compounds, thiourea compounds, xanthate compounds, or the like.

The inorganic filler may be talc, barium sulfate, sodium bicarbonate, graphite, lead sulfate, tripoli, wollastonite, or the like.

The surface of the compound layer 2 is coated with a layer 4, hereinafter referred to as graphite layer, of which principal component is graphite. Thereafter, a heat treatment is applied to the compound layer 2 and the graphite layer 4 in a temperature range of from 140° C. to 160° C. for 30 to 40 minutes. This heat treatment is performed in order to provide for a cross-linking of the rubber in the compound layer 2 and a synthetic resin which is mixed into the graphite layer 4. The synthetic resin is added to the graphite layers 4 so as to enable the graphite layer 4 to be applied to the compound layer 2, because graphite by itself can not be applied to the compound layer 2. The graphite layers 4 are provided to decrease the coefficient of friction of the compound layers 2 surfaces.

The anti-squeal shim 1 is provided with an appropriate number of relatively long and narrow holes 5 therethrough. A pair of upper hooks 6 are formed at the upper end of the anti-squeal shim 1 by bending tongue portions integrally formed at the upper end of the stainless steel plate 3. A lower hook 15 is formed at the lower end of the anti-squeal shim 1 by bending a tongue portion integrally formed at the lower end of the stainless steel plate 3. The thickness of the stainless steel plate 3 is 0.4 mm (400 micron), that of the compound layer 2 is 600 micron and that of the graphite layer 4 is from 2 to 3 micron.

Figure 4:
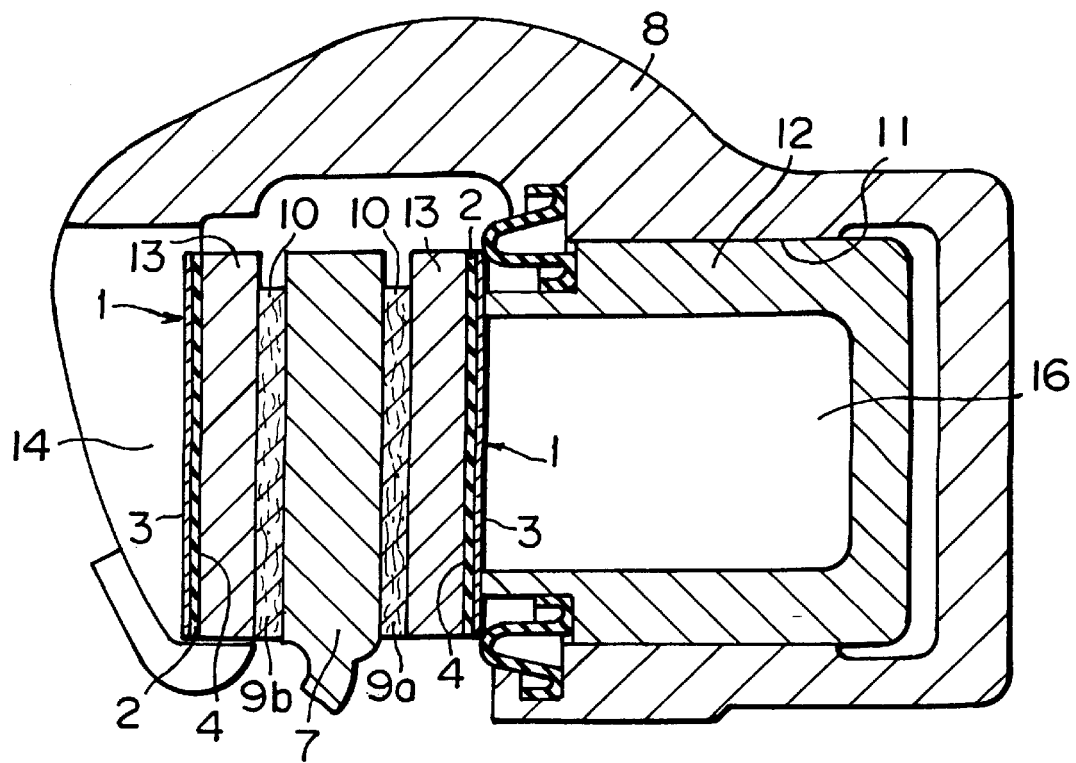
FIG. 4 is a cross sectional view of a disc brake equipped with the anti-squeal shim.

FIG. 4 shows one embodiment of a disc brake equipped with a pair of the anti-squeal shims 1. The disc brake includes a disc rotor 7 rotating with a wheel of a vehicle, not shown, and a caliper 8 supported by a fixed member of the vehicle and straddling the periphery of the disc rotor 7 so as to be movable in a direction parallel to the axis of the disc rotor 7. Inboard and outboard friction pads 9a and 9b are positioned on either side of the disc rotor 7. Each of the friction pads 9a and 9b has a backing plate 13 and a friction member 10 secured to the disc rotor side of the backing plate 13.

Figure 5:
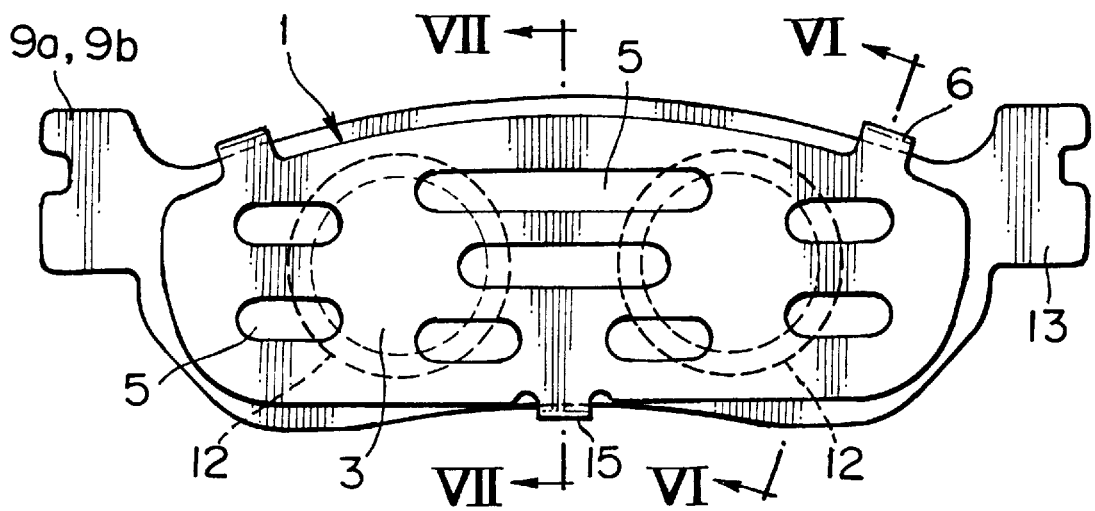
FIG. 5 is a rear view of a friction pad incorporated in the disc brake and the anti-squeal shim mounted thereon.
Figure 6:
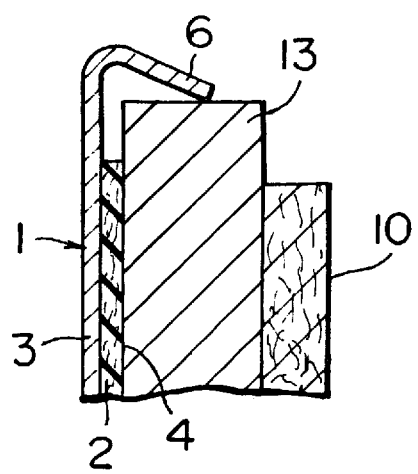
FIG. 6 is an enlarged cross sectional view of upper parts of the friction pad and the anti-squeal shim taken along the line VI—VI of FIG. 5 showing that an upper hook of the anti-squeal shim is engaged with the upper part of the friction pad.
Figure 7:
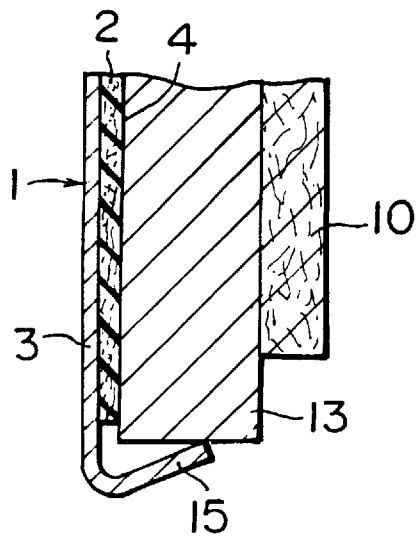
FIG. 7 is an enlarged cross sectional view of lower parts of the friction pad and the anti-squeal shim taken along the line VII—VII of FIG. 5 showing that a lower hook of the anti-squeal shim is engaged with the lower part of the friction pad.

The caliper 8 is provided with a pair of cylindrical bores 11 in one side thereof parallel to the axis of the rotor 7. Each cylindrical bore 11 slidably receives a brake piston 12 having a hollow configuration with a central bore 16, the open end of which piston 12 being opposed to the backing plate 13 of the inboard friction pad 9a. One of the anti-squeal shims 1, hereinafter referred to as inboard anti-squeal shim, is interposed between the pistons 12 and the backing plate 13 of the inboard friction pad 9a with the stainless steel plate 3 thereof opposed to the pistons 12 and with the compound layer 2 thereof opposed to the backing plate 13. Thus, the stainless steel plate 3 side of the inboard anti-squeal shim 1 is directly opposed to the open ends of the pistons 12 without the intervention of a backing-up shim, unlike conventional disc brakes. In such an arrangement, as shown in FIGS. 5 through 7, the inboard anti-squeal shim 1 is mounted on the backing plate 13 by engaging the upper hooks 6 and lower hook 15 with the backing plate 13 of the inboard friction pad 9a. As shown in FIG. 5, the open end of each piston 12 that has an annular shape lies across the holes 5.

The caliper 8 is provided, at the other end side, with a finger 14 opposed to the backing plate 13 of the outboard friction pad 9b. The other anti-squeal shim 1, hereinafter referred to as outboard anti-squeal shim, is interposed between the caliper finger 14 and the backing plate 13 of the outboard friction pad 9b with the stainless steel plate 3 opposed to the caliper finger 14 and with the compound layer 2 opposed to the backing plate 13. Thus, the outboard anti-squeal shim 1 is directly opposed to the caliper finger 14 without intervention of a backing-up shim, unlike conventional disc brakes. The outboard anti-squeal shim 1 is mounted on the backing plate 13 of the outboard friction pad 9b by engaging the upper hooks 6 and lower hook 15 with the backing plate 13 as shown in FIGS. 5 through 7.

Upon application of a brake fluid pressure to the cylindrical bore 11, the piston 12 is moved toward the disc rotor 7 (leftward in FIG. 4) to urge the inboard friction pad 9a against the inboard side of the disc rotor 7 through the inboard anti-squeal shim 1, while by the reaction to the pistons 12 movement, the caliper 8 is moved in the opposite direction (rightward in FIG. 4), causing the caliper finger 14 to urge the outboard friction pad 9b against the outboard side of the disc rotor 7 through the outboard anti-squeal shim 1.

Since the anti-squeal shims 1 have the compound layer 2 including the nonmetal fibers, the rubber and the filler, a stress relaxation is hard to occur even if the compound layer 2 is thickened. Consequently, even with the stainless steel plate 3 coated only on one face thereof with the compound layer 2, satisfactory vibration damping properties can be obtained and the brake squeal can be prevented effectively. Therefore, it is not necessary to coat the piston 12 side face of the stainless steel plate 3 of the inboard anti-squeal shim 1 and the caliper finger 14 side face of the stainless steel plate 3 of the outboard anti-squeal shim 1 with the compound layer 2 and thereby the backing-up shim is not necessary.

If the frictional heat generated between the friction pads 9a and 9b and the disc rotor 7 was not insulated well, it would transfer to the brake fluid in the cylindrical bore 11 via the friction pads 9a and 9b, the anti-squeal shims 1 and the pistons 12 and there would be fear of causing a "vapor lock phenomenon" where the brake refuses to work.

However, since the compound layers 2 include the nonmetal fibers which have a small thermal conductivity, the thermal insulating properties thereof is better than that of a rubber layer, alone and thereby the heat transfer from the friction pads 9a and 9b to the brake fluid in the cylindrical bore 11 via the anti-squeal shims 1 can be decreased and the reliability of the hydraulic system of the disc brake can be improved.

Further, since a backing-up shim is not necessary, the holes 5 are not closed by the backing-up shim and are allowed to limit the heat transmission paths of the disc brake. At the same time, the holes 5 form air passages which are open to the contact between the anti-squeal shims 1 and the pistons 12 or the caliper finger 14, causing air flows therethrough to efficiently radiate heat. Consequently, the heat insulating effect is improved and the heat transfer to the brake fluid is decreased, causing the reliability of the disc brake to be improved.

Though in the aforementioned embodiment the anti-squeal shims 1 are provided with holes 5, the anti-squeal shim may be provided with recesses at the periphery thereof in place of the holes or together with the holes.

Though the aforementioned embodiment is applied to a movable caliper type disc brake, the present invention may be applied to other types of disc brakes.

Although preferred embodiment of the present invention has been shown and described herein, it should be apparent that the present disclosure is made by way of example only and that variations thereto are possible within the scope of the disclosure without departing from the subject matter coming within the scope of the following claims and a reasonable equivalency thereof.

What is claimed is:

1. An anti-squeal shim to be interposed between a forcing member that urges a friction pad against a disc rotor and a backing plate of said friction pad in a disc brake, said anti-squeal shim comprising:

a metal plate;

a compound layer with which said metal plate is coated only on one side thereof, said compound including a nonmetal fiber other than asbestos, an elastomer and a filler, the thickness of said compound layer being from 200 to 800 microns; and a hole provided through the anti-squeal shim to form an air passage that is open to a contact between said anti-squeal shim and said forcing member.

2. The anti-squeal shim as set forth in claim 1, further comprising a layer of which principal component is graphite, which layer being applied to a surface of said compound layer.

3. A disc brake comprising:

a disc rotor rotating with a wheel of an automotive vehicle;

a pair of friction pads positioned on opposite sides of said disc rotor so as to be movable toward and away from the opposite sides of said disc rotor, said friction pads each having a backing plate and a friction member secured to said disc rotor side of said backing plate;

a hydraulic actuating means urging said friction pads through forcing members against the opposite sides of said disc rotor to restrain the rotation of said disc rotor; and an anti-squeal shim including a metal plate and a compound layer with which said metal plate is coated only on one side thereof, said compound including a nonmetal fiber other than asbestos, an elastomer and a filler, the thickness of said compound layer being from 200 to 800 microns, and a hole provided through the anti-squeal shim to form an air passage that is open to a contact between said anti-squeal shim and said forcing member, said anti-squeal shim being interposed between said forcing member and said backing plate with said metal plate opposed to said forcing member without intervention of a backing-up shim and with said compound layer opposed to said backing plate.

4. The disc-brake as set forth in claim 3, further comprising a layer of which principal component is graphite, which layer being applied to a surface of said compound layer.

5. The disc-brake as set forth in claim 3, wherein one of said forcing members is a piston having a hollow configuration with a central bore.

6. The anti-squeal shim as set forth in claim 1, wherein the nonmetal fiber is at least one selected from the group consisting of organic fiber and inorganic fiber.

7. The anti-squeal shim as set forth in claim 6, wherein the inorganic fiber is at least one selected from the group consisting of glass fiber, ceramic fiber, rock wool, mineral wool, fused quartz fiber, chemical process high silica fiber, fused alumina silicate fiber, alumina continuous fiber, stabilized zirconia fiber, boron nitride fiber, alkali titanate fiber and boron fiber.

8. The anti-squeal shim as set forth in claim 6, wherein the organic fibers are at least on selected from the group consisting of aromatic polyamide fibers, non-aromatic polyamide fibers, polyolefine fibers, polyester fibers, polyacrylonitrile fibers, polyvinyl alcohol fibers, polyvinylchloride fibers, polyurea fibers, polyurethane fibers, polyfluorocarbon fibers, phenol fibers, and cellulosic fibers.

9. The anti-squeal shim as set forth in claim 1, wherein the elastomer is selected from the group consisting of styrene-butadiene rubber, acrylonitrile-butadiene rubber, butadiene rubber, isobutylene-isoprene rubber, ethylene propylene rubber, fluoro rubber, silicone rubber, chlorosulfonated polyethylene, chloro-isobutane-isoprene rubber, epichlorohydrin rubber, and nitrile isoprene rubber.

10. The anti-squeal shim as set forth in claim 1, wherein the filler is selected from the group consisting of clay, talc, barium sulfate, sodum bicarbonate, graphite, lead sulfate, tripoli, and wollastonite.

11. The anti-squeal shim as set forth in claim 1, wherein the compound further comprises a rubber agent selected from the group consisting of sulfur, zinc oxide, magnesium oxide, peroxide, dinitrobenzene, thiazole compounds, polyamine compounds, sulfenamide compounds, dithiocarbonate compounds, aldehydamine compounds, guanidine compounds, thiourea compounds and xanthate compounds.

12. The anti-squeal shim as set forth in claim 1, wherein the metal plate comprises steel or stainless steel.

13. An anti-squeal shim to be interposed between a forcing member that urges a friction pad against a disc rotor and a backing plate of said friction pad in a disc brake, said anti-squeal shim comprising:
 a metal plate; and
 a compound layer with which said metal plate is coated only on one side thereof, said compound including a nonmetal fiber other than asbestos, an elastomer and a filler, the thickness of said compound layer being from 200 to 800 microns, wherein the metal plate has a thickness of about 0.4 mm.

14. the anti-squeal shim as set forth in claim 2, wherein the layer of which principal component is graphite has a thickness of about 2–3 micron.

15. The disc-brake as set forth in to claim 3, wherein the nonmetal fiber is at least one selected from the group consisting of organic fiber and inorganic fiber.

16. The disc-brake as set forth in claim 15, wherein the inorganic fiber is at least one selected from the group consisting of glass fiber, ceramic fiber, rock wool, mineral wool, fused quartz fiber, chemical process high silica fiber, fused alumina silicate fiber, alumina continuous fiber, stabilized zirconia fiber, boron nitride fiber, alkali titanate fiber and boron fiber.

17. The disc-brake as set forth in claim 15, wherein the organic fibers are at least on selected from the group consisting of aromatic polyamide fibers, non-aromatic polyamide fibers, polyolefine fibers, polyester fibers, polyacrylonitrile fibers, polyvinyl alcohol fibers, polyvinylchloride fibers, polyurea fibers, polyurethane fibers, polyfluorocarbon fibers, phenol fibers, and cellulosic fibers.

18. The disc-brake as set forth in claim 3, wherein the elastomer is selected from the group consisting of styrene-butadiene rubber, acrylonitrile-butadiene rubber, butadiene rubber, isobutylene-isoprene rubber, ethylene propylene rubber, fluoro rubber, silicone rubber, chlorosulfonated polyethylene, chloro-isobutane-isoprene rubber, epichlorohydrin rubber, and nitrile isoprene rubber.

19. The disc-brake as set forth in claim 3, wherein the filler is selected from the group consisting of clay, talc, barium sulfate, sodium bicarbonate, graphite, lead sulfate, tripoli, and wollastonite.

20. The disc-brake as set forth in claim 3, wherein the compound further comprises a rubber agent selected from the group consisting of sulfur, zinc oxide, magnesium oxide, peroxide, dinitrobenzene, thiazole compounds, polyamine compounds, sulfenamide compounds, dithiocarbonate compounds, aldehydamine compounds, guanidine compounds, thiourea compounds and xanthate compounds.

21. The disc-brake as set forth in claim 3, wherein the metal plate comprises steel or stainless steel.

22. A disc brake comprising:
 a disc rotor rotating with a wheel of an automotive vehicle;
 a pair of friction pads positioned on opposite sides of said disc rotor so as to be movable toward and away from the opposite sides of said disc rotor, said friction pads each having a backing plate and a friction member secured to said disc rotor side of said backing plate;
 a hydraulic actuating means urging said friction pads through forcing members against the opposite sides of said disc rotor to restrain the rotation of said disc rotor; and
 an anti-squeal shim including a metal plate and a compound layer with which said metal plate is coated only on one side thereof, said compound including a nonmetal fiber other than asbestos, an elastomer and a filler, the thickness of said compound layer being from 200 to 800 microns, said anti-squeal shim being interposed between said forcing member and said backing plate with said metal plate opposed to said forcing member without intervention of a backing-up shim and with said compound layer opposed to said backing plate, wherein the metal plate has a thickness of about 0.4 mm.

23. The disc-brake as set forth in claim 4, wherein the layer of which principal component is graphite has a thickness of about 2–3 micron.

24. An anti-squeal shim to be interposed between a forcing member that urges a friction pad against a disc rotor and a backing plate of said friction pad in a disc brake, said anti-squeal shim comprising:
 a metal plate; and a compound layer with which said metal plate is coated only on one side thereof, said compound including a nonmetal fiber other than asbestos, an elastomer and a filler, the thickness of said compound layer being from 200 to 800 microns, wherein the compound comprises about 30% by weight glass fiber, about 10% by weight fibrillated aromatic polyamide fiber, about 16% by weight nitrile rubber, about 4% by weight of rubber agent and about 40% by weight of inorganic filler.

25. The anti-squeal shim as set forth in claim 1, wherein the metal plate has a thickness of about 0.4 mm.

26. The disc-brake as set forth in claim 3, wherein the metal plate has a thickness of about 0.4 mm.

* * * * *